United States Patent
Matsuda et al.

(10) Patent No.: US 9,115,251 B2
(45) Date of Patent: Aug. 25, 2015

(54) ELECTROLYTE MEMBRANE, FUEL CELL, AND ELECTROLYTE MEMBRANE MANUFACTURING METHOD

(75) Inventors: Atsunori Matsuda, Toyohashi (JP); Song-Yul Oh, Toyohashi (JP); Toshihiro Yoshida, Toyohashi (JP); Go Kawamura, Toyohashi (JP); Junichi Hamagami, Hachioji (JP); Mototsugu Sakai, Kosai (JP)

(73) Assignee: NATIONAL UNIVERSITY CORPORATION TOYOHASHI UNIVERSITY OF TECHNOLOGY, Toyohashi-Shi, Aichi (JP)

(*) Notice: Subject to any disclaimer, the term of this patent is extended or adjusted under 35 U.S.C. 154(b) by 427 days.

(21) Appl. No.: 13/479,527

(22) Filed: May 24, 2012

(65) Prior Publication Data

US 2012/0231354 A1    Sep. 13, 2012

Related U.S. Application Data

(63) Continuation-in-part of application No. PCT/JP2010/071131, filed on Nov. 26, 2010.

(30) Foreign Application Priority Data

Nov. 29, 2009 (JP) ................. 2009-270890

(51) Int. Cl.
*H01M 8/10* (2006.01)
*C08J 5/22* (2006.01)
(Continued)

(52) U.S. Cl.
CPC . *C08G 73/18* (2013.01); *C08J 5/22* (2013.01); *C08J 5/2275* (2013.01); *C08L 79/04* (2013.01);
(Continued)

(58) Field of Classification Search
None
See application file for complete search history.

(56) References Cited

U.S. PATENT DOCUMENTS

| 2003/0099874 | A1 | 5/2003 | Kim et al. | |
| 2005/0113547 | A1* | 5/2005 | Li et al. | 528/30 |

(Continued)

FOREIGN PATENT DOCUMENTS

| EP | 1624519 | 5/2003 |
| EP | 1309025 | 2/2006 |

(Continued)

OTHER PUBLICATIONS

Oh et al., Inorganic-organic composite electrolytes consisting of polybenzimidazole and Cs-substituted heteropoly acids and their application for medium temperature fuel cells, J. Mater. Chem. 2010 (20), pp. 6359-6366, Jun. 2010.*

(Continued)

*Primary Examiner* — Jonathan Crepeau
(74) *Attorney, Agent, or Firm* — Day Pitney LLP

(57) ABSTRACT

A composite membrane that can be used as an electrolyte membrane of a fuel cell is produced from a resin material that contains at least polybenzimidazole and from a composite material that is produced from of hydrogen sulfate and heteropoly acid. The composite membrane has a basic structure of an aromatic hydrocarbon that does not contain fluorine and has good efficiency, even at a low doping level, so it can be used for the electrolyte membrane of a medium temperature dry fuel cell. Phosphoric acid is doped into the composite membrane. Characteristics of the relationship between output current density and output voltage for an electrolyte membrane that is made from the created composite membrane (a specimen 4) are better than for a specimen 8, in which the amount of phosphoric acid doping is equivalent.

15 Claims, 20 Drawing Sheets

(51) Int. Cl.
*C08G 73/18* (2006.01)
*C08L 79/04* (2006.01)
*H01B 1/12* (2006.01)
*H01M 8/02* (2006.01)

(52) U.S. Cl.
CPC ............. *H01B 1/122* (2013.01); *H01M 8/0291* (2013.01); *H01M 8/1018* (2013.01); *H01M 8/1048* (2013.01); *C08J 2379/04* (2013.01); *Y02E 60/521* (2013.01)

(56) References Cited

U.S. PATENT DOCUMENTS

| | | |
|---|---|---|
| 2006/0027789 A1 | 2/2006 | Ivanov et al. |
| 2006/0141316 A1 | 6/2006 | Kang |
| 2007/0184323 A1* | 8/2007 | Lee et al. ................... 429/33 |

FOREIGN PATENT DOCUMENTS

| | | |
|---|---|---|
| JP | 2003-178777 | 6/2003 |
| JP | 2005-25943 | 1/2005 |
| JP | 2006-54179 | 2/2006 |
| JP | 2006-185919 | 7/2006 |
| JP | 2007-165006 | 6/2007 |
| JP | 2008-218299 | 9/2008 |

OTHER PUBLICATIONS

International Preliminary Report on Patentability and Written Opinion of the International Searching Authority (in the English and Japanese languages), for related international application No. PCT/JP2010/071131.

* cited by examiner

ELECTROLYTE MEMBRANE, FUEL CELL, AND ELECTROLYTE MEMBRANE MANUFACTURING METHOD

CROSS-REFERENCE TO RELATED APPLICATION

The present application is a continuation-in-part of International Application No. PCT/JP2010/071131, filed Nov. 26, 2010, which claims priority from Japanese Patent Application No. 2009-270890, filed on Nov. 29, 2009. The disclosure of the foregoing application is hereby incorporated by reference in its entirety.

BACKGROUND

The present disclosure relates to an electrolyte membrane, a fuel cell, and an electrolyte membrane manufacturing method. More specifically, the present disclosure relates to an electrolyte membrane that can be used in a fuel cell that operates under medium temperature, non-humidified conditions, a fuel cell that uses the electrolyte membrane, and an electrolyte membrane manufacturing method.

Recently, the development of a medium temperature dry fuel cell (MTDFC) that operates in a medium temperature region of 100° C. to 250° C. under conditions of low humidification or no humidification has been anticipated. The MTDFC can simplify a fuel reformer. Moreover, the MTDFC does not require a humidifier. The MTDFC can also improve the energy utilization rate by utilizing exhaust heat. Out of consideration for the environment, the MTDFC is required to use an electrolyte membrane with a basic structure of an aromatic hydrocarbon that does not contain fluorine.

An electrolyte membrane with a basic structure of polybenzimidazole (PBI) has been proposed as an electrolyte membrane with a basic structure of an aromatic hydrocarbon that does not contain fluorine (for example, refer to Patent Document 1). The electrolyte membrane contains PBI, an inorganic acid, and adenylic acid. The energy utilization rate of the electrolyte membrane can be improved by raising its phosphoric acid doping ratio to increase its conductivity.

CITATION LIST

Patent Documents

Patent Document 1
Japanese Laid-Open Patent Publication No. 2008-218299

SUMMARY

Ordinarily, in an electrolyte membrane with PBI as its basic structure, the phosphoric acid with which it is doped tends to leak and seep out of the membrane with the passage of time. Therefore, even in a case where the conductivity has been increased by doping with a large amount of phosphoric acid, as with the electrolyte membrane that is described above, a problem arises in that the conductivity of the electrolyte membrane diminishes when the membrane is used for a long time. Another major problem is that the phosphoric acid that has leaked and seeped out corrodes surrounding members. Accordingly, an electrolyte membrane is required that has good energy efficiency and shows good conductivity even in a case where the amount of the doping phosphoric acid has been reduced.

An object of the present disclosure is to provide an electrolyte membrane that can be used in the MTDFC and that has high conductivity and good energy efficiency even in a case where an aromatic hydrocarbon that does not contain fluorine is used for the basic structure and the amount of the doping phosphoric acid has been reduced, as well as to provide both a fuel cell that uses the electrolyte membrane and an electrolyte membrane manufacturing method.

An electrolyte membrane according to a first aspect of the present disclosure contains at least a resin material that contains at least polybenzimidazole, a composite material that is produced from hydrogen sulfate and heteropoly acid, and in which the hydrogen sulfate and the heteropoly acid are bonded by a hydrogen bond, and an electron-accepting substance.

In the electrolyte membrane according to the first aspect of the present disclosure, the polybenzimidazole is used as the resin material. That makes it possible to produce the electrolyte membrane such that it has flexibility and is made from a composite membrane that contains an inorganic substance. The electrolyte membrane can achieve high conductivity in the medium temperature region (100° C. to 250° C., particularly 150° C. to 180° C.) by utilizing the intrinsic capacity of polybenzimidazole to absorb phosphoric acid. Therefore, the electrolyte membrane can achieve favorable operating characteristics in a case where it is used in a fuel cell. A monovalent cation is thus quantitatively substituted for a proton of the heteropoly acid. The hydrogen sulfate and the heteropoly acid are thus bonded by a hydrogen bond. It is therefore possible to give the composite material water resistance, high proton conductivity, and the like.

Furthermore, in the first aspect, the mole ratio of the hydrogen sulfate and the heteropoly acid that are contained in the composite material may be in a range from 50:50 to 10:90. This makes it possible to create the electrolyte membrane such that it has the optimum finely textured surface structure (pore diameter, pore volume, specific surface area, and the like).

Further, in the first aspect, the electron-accepting substance may be phosphoric acid. The electrolyte membrane can thus be made to have superior electrical conductivity.

Furthermore, in the first aspect, the phosphoric acid may be present at a ratio of not less than 172% and not greater than 350% of the total weight of the resin material and the composite material. The electrolyte membrane can exhibit good energy efficiency even at this low amount of doping.

Furthermore, in the first aspect, the hydrogen sulfate may contain a monovalent cation. The heteropoly acid may also contain one of phosphorus and silicon. The heteropoly acid may also contain one of tungsten and molybdenum as a hetero atom. New hydrogen bonds are thus formed between the heteropoly acid and one of the hydrogen sulfate ions and the phosphoric acid ions. The electrical conductivity of the electrolyte membrane can therefore be enhanced, particularly under non-humidified conditions.

A fuel cell according to a second aspect of the present disclosure is provided with the electrolyte membrane according to the first aspect. This makes it possible to produce the fuel cell with high energy efficiency, even in a case where the amount of the doping electron-accepting substance has been reduced.

An electrolyte membrane manufacturing method according to a third aspect of the present disclosure includes a first process that creates, by mechanical milling of hydrogen sulfate and heteropoly acid, a composite material in which the hydrogen sulfate and the heteropoly acid are bonded by a hydrogen bond, a second process that creates a composite membrane that contains at least the composite material that has been created by the first process and a resin material that contains at least polybenzimidazole, and a third process that creates an electrolyte membrane by doping an electron-accepting substance into the composite membrane that has been made by the second process.

In the electrolyte membrane manufacturing method according to the third aspect of the present disclosure, the polybenzimidazole is used as the resin material. That makes it possible to produce the electrolyte membrane such that it has flexibility and is made from a composite membrane that contains an inorganic substance. The electrolyte membrane can achieve high conductivity in the medium temperature region (100° C. to 250° C., particularly 150° C. to 180° C.) by utilizing the intrinsic capacity of polybenzimidazole to absorb phosphoric acid. Therefore, the electrolyte membrane can achieve favorable operating characteristics in a case where it is used in a fuel cell. The mechanical milling imparts mechanical energy to the hydrogen sulfate and the heteropoly acid by impact. A monovalent cation is thus quantitatively substituted for a proton of the heteropoly acid. The hydrogen sulfate and the heteropoly acid are thus bonded by a hydrogen bond. It is therefore possible to give the composite material water resistance, high proton conductivity, and the like.

In the third aspect, a fourth process may also be provided that creates the resin material by creating the polybenzimidazole by polymerizing diaminobenzidine and isophthalic acid. This makes it possible to create the resin material such that the composite membrane can be produced.

In the third aspect, a fourth process may also be provided that creates the resin material by creating the polybenzimidazole by polymerizing diaminobenzidine hydrochloride and isophthalic acid. This makes a reaction at high temperature possible, so the purity of the polybenzimidazole that is produced can be increased. The polymerization reaction speed of the diaminobenzidine hydrochloride can also be increased.

Furthermore, in the third aspect, the composite membrane may be made in the second process such that it also contains lithium chloride. This makes it possible to dope the electron-accepting substance uniformly within the membrane.

In the third aspect, the second process may also be provided with a fifth process that removes the lithium chloride by washing the created composite membrane with hot water. The electrolyte membrane is thus produced with high quality. It therefore becomes possible to perform the doping of the electron-accepting substance effectively.

Furthermore, in the third aspect, the electron-accepting substance may be phosphoric acid. The electrolyte membrane can thus be made to have superior electrical conductivity.

In addition, in the third aspect, the phosphoric acid may be doped in the third process at a ratio of not less than 172% and not greater than 350% of the total weight of the resin material and the composite material. The electrolyte membrane can exhibit good energy efficiency even at this low amount of doping.

DETAILED DESCRIPTION

Figure 1:
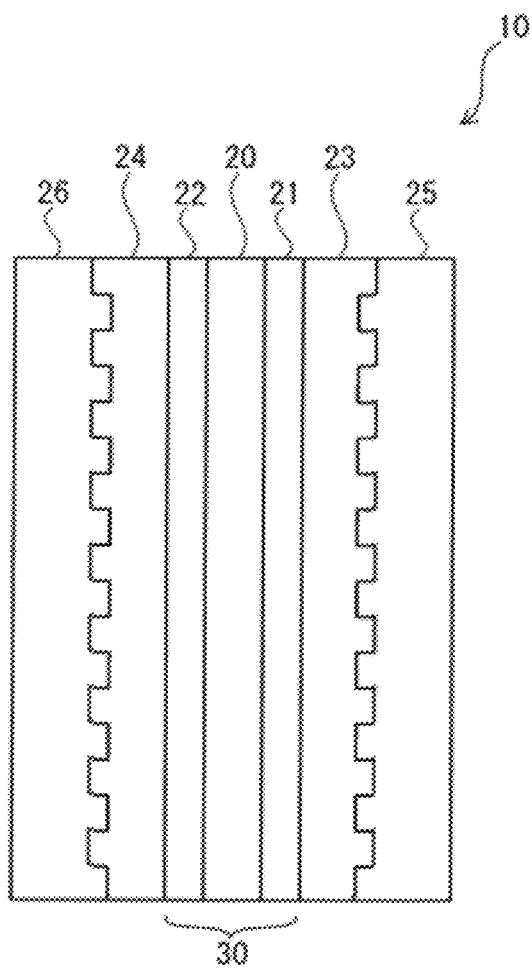
FIG. 1 is a figure that shows a structure of a fuel cell 10.

Hereinafter, an electrolyte membrane 20, a fuel cell 10, and an electrolyte membrane manufacturing method (refer to FIG. 2) according to the present disclosure will be explained with reference to the drawings. The drawings will be used to explain technological features that the present disclosure can use. The configurations, flowcharts, and the like that are described in the drawings are merely explanatory examples and are not intended to limit the present disclosure to only those forms.

Fuel Cell 10

A configuration of the fuel cell 10 will be explained with reference to FIG. 1. The fuel cell 10 is a medium temperature dry fuel cell (MTDFC). The fuel cell 10 is provided with the electrolyte membrane 20, an anode 21, a cathode 22, gas diffusion layers 23, 24, and separators 25, 26. The anode 21 and the cathode 22 are electrodes that are formed on respective faces of the electrolyte membrane 20. The gas diffusion layers 23, 24 sandwich the anode 21 and the cathode 22 from opposite sides. The separators 25, 26 are respectively positioned on the outer sides of the gas diffusion layers 23, 24.

The electrolyte membrane 20 will be explained. The electrolyte membrane 20 is provided with a composite membrane that includes at least a resin material that includes at least polybenzimidazole (hereinafter called PBI) and a composite material (hereinafter simply called the composite material) that is produced by mechanical milling of hydrogen sulfate and heteropoly acid. The composite membrane is doped with phosphoric acid.

Using PBI as the resin material makes it possible to create an electrolyte membrane that has flexibility and is made from a composite membrane that contains an inorganic substance. Moreover, high conductivity in the medium temperature region (100° C. to 250° C., particularly 150° C. to 180° C.) can be achieved by utilizing the intrinsic capacity of PBI to absorb phosphoric acid. Therefore, the composite membrane can achieve favorable operating characteristics in a case where it is used as the electrolyte membrane 20 of the fuel cell 10. Note that the resin material is not limited to PBI, and sulfonated polyether ether ketone (hereinafter also called SPEEK), for example, may also be used alone. A flexible composite membrane can be produced even in a case where SPEEK is used alone. However, SPEEK is intrinsically a hydrated material that transfers protons (hydrogen ions)

through water. Therefore, in a case where SPEEK is used alone, it is extremely difficult to generate electricity under medium temperature non-humidified conditions. It is therefore preferable to use PBI as the resin material.

Note that the resin material may also have a structure that contains PBI and SPEEK. In cases where an inorganic composite material is added to PBI, it sometimes happens that the intrinsic flexibility of PBI decreases. In contrast, the flexibility can be maintained by adding a small amount of SPEEK to PBI.

In a case where the resin material is a structure that contains PBI and SPEEK, the weight ratio of PBI to SPEEK can be adjusted within the range of 5:5 to 9:1, considering the sulfonation rate (also called the degree of sulfonation (DS)) of the SPEEK, but it is preferable for it to be 9:1. There is concern that the intrinsic phosphoric acid absorption rate of PBI will decrease as the ratio of the SPEEK functional groups (sulfone groups) to PBI increases.

It is desirable for the hydrogen sulfate that is a constituent of the composite material to contain a monovalent cation. It is desirable for the monovalent cation to be one of a rubidium ion, a cesium ion, a potassium ion, and an ammonium ion, and it is more desirable for it to be a rubidium ion or a cesium ion. This allows the monovalent cation to be quantitatively substituted for a proton of the heteropoly acid that is a constituent of the composite material. It is desirable for the hydrogen sulfate to be basically an acidic salt such as a partial sulfate salt or a partial phosphate salt, and among these, it is more desirable for the hydrogen sulfate to be a partial sulfate salt or a partial phosphate salt of rubidium, cesium, potassium, or ammonium. Here, the term partial sulfate salt indicates a salt in which one of the two hydrogen atoms in the sulfate has been replaced by another monovalent cation. The term partial phosphate salt indicates a salt in which one or two of the three hydrogen atoms in the phosphate has been replaced by another monovalent cation.

It is desirable for the heteropoly acid that is a constituent of the composite material to contain phosphorus or silicon. It is also desirable for the heteropoly acid to contain tungsten or molybdenum as the hetero atom. These conditions allow new hydrogen bonds to be formed between the heteropoly acid and the hydrogen sulfate ions or the phosphoric acid ions. The hydrogen bonds act to enhance conductivity, particularly under non-humidified conditions. To be specific, suitable heteropoly acids include phosphotungstic acid ($H_3[PW_{12}O_{40}]\cdot nH_2O$), silicotungstic acid ($H_4[SiW_{12}O_{40}]\cdot nH_2O$), phosphomolybdic acid ($H_3[Mo_{12}O_{40}]\cdot nH_2O$), silicomolybdic acid ($H_4[SiMo_{12}O_{40}]nH_2O$), and the like.

The composite material is produced by mechanical milling of the hydrogen sulfate and the heteropoly acid. The mechanical milling imparts mechanical energy by impact. The monovalent cation is thus quantitatively substituted for a proton of the heteropoly acid. The hydrogen sulfate and the heteropoly acid are bonded by a hydrogen bond. It is therefore possible to give the composite material water resistance, high proton conductivity, and the like. In the mechanical milling, a planetary ball mill, a rotary ball mill, a vibratory ball mill, an agitator ball mill, or the like, may be used, for example. The hydrogen sulfate and the heteropoly acid are finely mixed by the mechanical milling.

It is desirable for the mole ratio of the hydrogen sulfate and the heteropoly acid to be from 50:50 to 10:90, and more desirable for it to be 50:50. Maintaining this ratio means that the ions in the hydrogen sulfate will be substituted for the protons in the heteropoly acid at a mole ratio of 1:1. This makes it possible to create a composite membrane that has the optimum finely textured surface structure (pore diameter, pore volume, specific surface area, and the like).

It is desirable for the weight ratio of the resin material and the composite material that make up the composite membrane to be from 5:1 to 5:10, and it is even more desirable for it to be 5:1. In a case where the weight ratio of the composite material in the composite membrane increases in relation to the resin material, there is an advantage in that the electrochemical performance is improved. It is also the case that mechanical properties such as flexibility and the like diminish.

It is desirable for the doping of the composite membrane to be done with the doping phosphoric acid at a ratio of not less than 172% and not greater than 350% of the weight of the composite membrane, and it is even more desirable for the doping to be done at a ratio of not less than 250% and not greater than 350%. It is most desirable for the ratio to be 277%. It is known that ordinarily, with an electrolyte membrane that is made of PBI only, good energy efficiency is not shown if the doping is not done with the phosphoric acid at not less than 350%. In contrast to this, with the electrolyte membrane 20 of the present embodiment, good energy efficiency is shown even with a comparatively low doping amount of not less than 172% and not greater than 350% (details will be described later). Phosphoric acid is the most desirable as the doping substance, but the composite membrane may also be doped with an electron-accepting substance (sulfuric acid or the like) that can act on both sides of acidity and basicity, for example.

The anode 21 and the cathode 22 will be explained. The anode 21 and the cathode 22 are provided with platinum or the like, for example, as a catalyst. The electrolyte membrane 20, the anode 21, and the cathode 22 form a membrane electrode assembly (MEA) 30.

The gas diffusion layers 23, 24 are electrically conductive members that have permeability to gas. The gas diffusion layers 23, 24 serve as flow paths for gases that are supplied to an electro-chemical reaction. The separators 25, 26 are electrically conductive members that are not permeable to gas. The separators 25, 26 each have a specified concavo-convex shape. Flow paths in which a fuel gas that contains hydrogen flows are formed between the separator 25 and the gas diffusion layer 23 by the concavo-convex shape. Flow paths in which an oxide gas that contains oxygen flows are formed between the separator 26 and the gas diffusion layer 24 by the concavo-convex shape.

Note that the fuel cell 10 is not limited to the structure that is described above. For example, the MEA 30 may also have a layered structure.

Method for Manufacturing the Electrolyte Membrane 20

A method for manufacturing the electrolyte membrane 20 will be explained with reference to FIG. 2. First, the resin material is created by the creating of the PBI (Step S11). In this process, 3, 3',4,4'-diaminobenzidine (DAB) and isophthalic acid (IPA) are agitated in polyphosphoric acid (PPA). A polymerization reaction is promoted by this. After the polymerization reaction, the polymer is washed until its pH becomes neutral. The PBI is produced by this process.

The PBI may also be created by the method hereinafter described. DAB is dissolved in an aqueous solution of hydrochloric acid. DAB hydrochloride (DAB.nHCl) is produced by agitating, heating, and drying the solution. The produced DAB.nHCl is agitated in IPA and PPA, and a polymerization reaction is promoted. After the polymerization reaction, the polymer is washed until its pH becomes neutral. The PBI is produced by this process.

The melting point of pure DAB is close to 170° C. When pure DAB exceeds 170° C., it begins to break down at close to 200° C. Therefore, when PBI is polymerized, the polymerization reaction must be carried out at a temperature that is not greater than 200° C. In contrast, the melting point of DAB hydrochloride is higher than that of pure DAB (close to 300° C.), so the reaction can be carried out at high temperature. In a case where DAB hydrochloride is reacted at high temperature, the amount of unreacted DAB hydrochloride remaining in the PBI is reduced. The purity of the produced PBI is thus increased. Moreover, because pure PBI is basic, its reaction in polyphosphoric acid is slow. In contrast, the polymerization reaction speed of the acidic DAB hydrochloride is comparatively fast.

SPEEK can be synthesized and added to the PBI as necessary. SPEEK is created by sulfonating polyether ether ketone (PEEK). PEEK is sulfonated by being agitated in concentrated sulfuric acid. The sulfonated PEEK is washed until its pH becomes neutral. SPEEK is thus produced. The resin material is produced by adding SPEEK to the PBI as necessary. The weight ratio of PBI to SPEEK is adjusted within the range of 5:5 to 9:1, preferably such that the weight ratio is 9:1.

The composite material is created (Step S13). In the process, hydrogen sulfate is added to a hydrate of heteropoly acid. The mole ratio of the hydrogen sulfate and the hydrate of heteropoly acid is adjusted within the range from 50:50 to 10:90. Preferably, the mole ratio of the hydrogen sulfate and the hydrate of heteropoly acid is adjusted to 50:50. After the hydrogen sulfate has been added to the hydrate of heteropoly acid, mechanical milling is performed. In the mechanical milling, a planetary ball mill, a rotary ball mill, a vibratory ball mill, an agitator ball mill, or the like, may be used, for example. After the mechanical milling, a drying process is carried out. The composite material (the heteropoly acid—hydrogen sulfate composite material) is thus created.

The composite membrane is created that contains the resin material that was created at Step S11 and the composite material that was created at Step S13 (Step S15). The resin material and the composite material are dissolved and dispersed in a casting solvent. The weight ratio of the resin material and the composite material is 5:1 to 5:10, and is preferably 5:1. A stabilizing agent may also be added to the resin material and the composite material. Lithium chloride (LiCl) can be used as the stabilizing agent. The adding of the stabilizing agent makes it possible for the phosphoric acid to be doped uniformly within the membrane in the phosphoric acid doping process (Step S19), which will be described later. The solution that is produced is formed into a film on a glass substrate by the casting method. The composite membrane that is formed from the resin material and the composite material is thus produced.

In a case where the stabilizing agent has been added to the composite material at Step S15, the stabilizing agent within the produced composite membrane forms chemical bonds at the sites where the phosphoric acid is doped into the PBI. The stabilizing agent therefore becomes a factor in lowering the phosphoric acid doping level, lowering the mechanical strength of the composite membrane, and the like. It is therefore desirable to remove the stabilizing agent completely from the composite membrane. The composite membrane that was produced by the processing at Step S15 is washed with hot water. The stabilizing agent in the composite membrane is thus removed (Step S17). In the end, a high-quality composite membrane that can be effectively doped with phosphoric acid is produced by the removing of the stabilizing agent.

Phosphoric acid is doped into the composite membrane (Step S19). The composite membrane is immersed in the phosphoric acid and is heated. The phosphoric acid is thus doped into the interior of the composite membrane. The amount of phosphoric acid doping can be regulated by varying the time that the composite membrane is immersed in the phosphoric acid. The phosphoric acid is doped at a ratio of 172% to 350% of the weight of the composite membrane, preferably at a ratio of 250% to 350%, and most desirably at a ratio of 277%.

In the electrolyte membrane 20, the phosphoric acid that has been doped contributes to proton conduction. The fuel cell 10 that uses the electrolyte membrane 20 does not need to be humidified. The electrolyte membrane 20 can therefore be used in the fuel cell 10, which operates under medium temperature, non-humidified conditions. Furthermore, within the electrolyte membrane 20, the composite material also contributes to proton conduction. The electrolyte membrane 20 therefore exhibits high electrical conductivity, even in a case where the amount of phosphoric acid doping is small. Therefore, even in a case where the phosphoric acid has leaked out of the electrolyte membrane 20 and the phosphoric acid doping level has dropped, the electrolyte membrane 20 can maintain a state of high energy efficiency. Using the electrolyte membrane 20 therefore makes it possible to make the fuel cell 10 with better energy efficiency.

Figure 2:
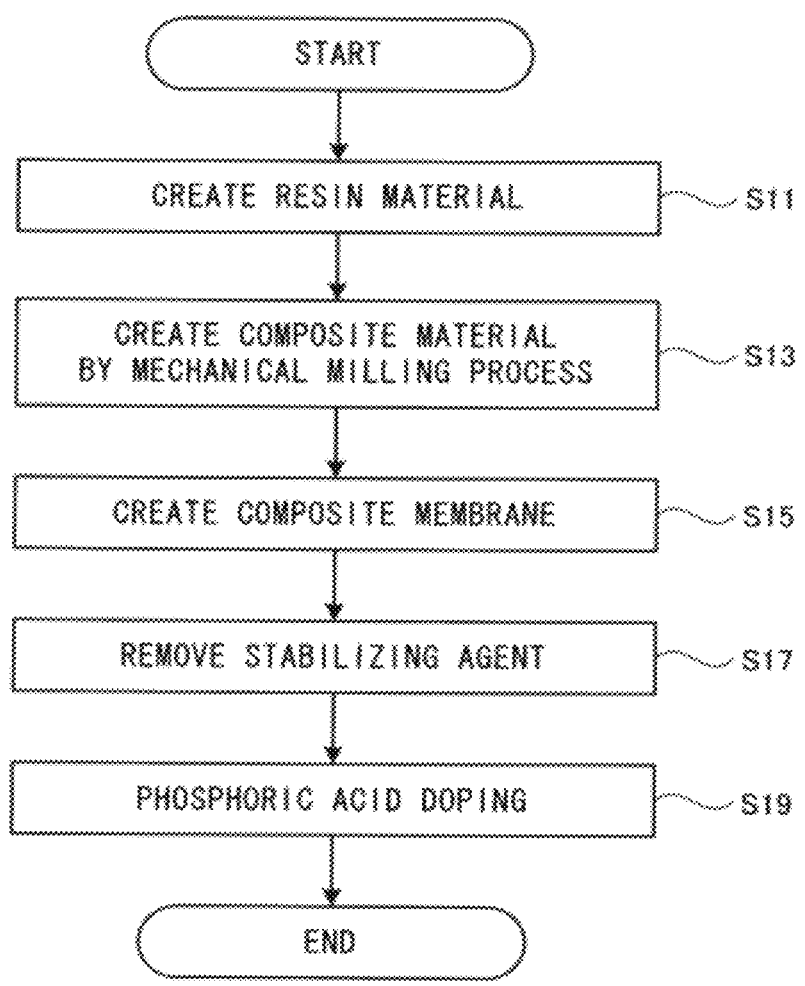
FIG. 2 is a flowchart that shows a method for manufacturing an electrolyte membrane 20.

Note that the processing at Step S11 in FIG. 2 is equivalent to a fourth process of the present disclosure. The processing at Step S13 is equivalent to a first process of the present disclosure. The processing at Steps S15 and S17 is equivalent to a second process of the present disclosure. The processing at Step S19 is equivalent to a third process of the present disclosure. The processing at Step S17 is equivalent to a fifth process of the present disclosure.

First Example

The present disclosure will be explained in greater detail using an example. However, the present disclosure is not limited by this example. Hereinafter, 1. manufacturing methods, 2. evaluation methods, and 3. evaluation results will be explained in order.

1. Manufacturing Methods

PBI Creation (Using Dab)

The method for creating PBI from DAB will be explained. 2.5 grams (11.7 mmol) of 3, 3'-diaminobenzidine (DAB, Tokyo Chemical Industry Co. Ltd.) and 1.94 grams (11.7 mmol) isophthalic acid (IPA, Kishida Chemical Co. Ltd.) are prepared such that the mole ratio is 1:1. The prepared DAB and IPA are dissolved in 160 grams of polyphosphoric acid (PPA, Kishida Chemical Co. Ltd.). The PPA solution that contains DAB and IPA is agitated for 72 hours at 170° C. to 200° C. in a nitrogen atmosphere. The PBI polymerization reaction is thus promoted. A PBI solution is produced as a result.

The PBI solution is put into a large amount of ice-cold water and agitated. A brown powder is thus produced. The brown powder is washed three times using an aqueous solution of 5% ammonia by volume. The brown powder is thereafter washed using ion-exchange water until its pH becomes neutral. PBI is thus produced. The produced PBI is dried for 10 hours in an oven (FO-30W (WT), TGK Tokyo Garasu Kikai Co. Ltd.) at 120° C. Next, the PBI is dried for 10 hours in a vacuum oven (Isuzu Seisakusho Co., Ltd.) at 120° C. A dark gold PBI powder is thus produced. Hereinafter, the produced PBI will be called PBI-1.

PBI Creation (Using DAB.nHCl)

A method for creating PBI from DAB.nHCl will be explained. 2.5 grams of DAB and 46.7 milliliters of a 1M aqueous solution of hydrochloric acid are prepared such that the mole ratio of DAB to hydrochloric acid is 1:4. The DAB is dissolved in the aqueous hydrochloric acid solution and agitated for 3 hours at 60° C. Next, the aqueous solution is slowly evaporated on a hot plate at 120° C. A white powder is thus produced. The produced powder is dried for 10 hours in an oven at 120° C. A light violet powder of DAB hydrochloride (DAB.nHCl) is thus produced. The same sort of method as the method described above for creating the PBI-1 is performed on the produced DAB.nHCl. A PBI powder is thus produced. Hereinafter, the produced PBI will be called PBI-2.

SPEEK Creation

A method for creating SPEEK will be explained. Five grams of powdered PEEK (registered trademark)—P450 (made by Victrex Plc) is dissolved in 100 grams of concentrated sulfuric acid. The solution is agitated for 24 hours at room temperature (25° C.) in a nitrogen atmosphere. A sulfonation reaction is thus promoted. A SPEEK solution is produced as a result. The SPEEK solution is put into a large amount of ice-cold water and agitated. A white mass is thus produced. The white mass is washed using ion-exchange water until its pH becomes neutral. After the washing, the SPEEK is produced by filtering. The SPEEK is dried in an oven for 10 hours at 120° C., and then is dried in a vacuum oven for 10 hours at 120° C.

Composite Material Creation

One of phosphotungstic acid hydrate (WPA.nH$_2$O) (Wako Pure Chemical Industries, Ltd.) and silicotungstic acid hydrate (WSiA.nH$_2$O) (Sigma-Aldrich Japan) is used as a heteropoly acid hydrate. The heteropoly acid hydrate is dried for 24 hours in an oven at 60° C. Heteropoly acid 6 hydrate is thus produced. Cesium hydrogen sulfate (Wako Pure Chemical Industries, Ltd.) is added to the produced heteropoly acid 6 hydrate in such a ratio that the mole ratio is 1:1. The cesium hydrogen sulfate is added to the heteropoly acid 6 hydrate such that the total weight is 2 grams. Milling of the heteropoly acid 6 hydrate and the cesium hydrogen sulfate is performed by a planetary ball mill (Fritsch Pulverisette 7, (Fritsch Japan Co. Ltd.)). The milling process is performed at a revolution speed of 720 rpm for 1 hour in a nitrogen atmosphere. A composite material (a heteropoly acid—cesium hydrogen sulfate composite material) is thus produced. The produced composite material is dried in an oven for 10 hours at 120° C., and then is dried in a vacuum oven for 10 hours at 120° C. The composite material that is produced using the phosphotungstic acid hydrate will hereinafter be called the P composite material. The composite material that is produced using the silicotungstic acid hydrate will hereinafter be called the Si composite material.

Composite Membrane Creation

A resin material that contains only PBI (one of PBI-1 and PBI-2) and a resin material that contains PBI (one of PBI-1 and PBI-2) and SPEEK are both prepared. The PBI and the SPEEK are combined such that the weight ratio is 9:1. N,N-dimethylacetamide (DMAc, Wako Pure Chemical Industries, Ltd.) is used as a casting solvent. The resin material is dissolved in the casting solvent. The weight ratio of the resin material to the casting solvent is 5%. Next, a composite material (one of the P composite material and the Si composite material) is dissolved into the casting solvent. The resin material and the composite material are combined such that the weight ratio is 5:1. Lithium chloride (LiCl, Wako Pure Chemical Industries, Ltd.) is added to the casting solvent as a stabilizing agent. The weight ratio of the LiCl to the resin material is 5%. The produced solution is agitated for 24 hours at 100° C. in a nitrogen atmosphere.

The agitated solution is cast on a glass substrate.

After the casting, the glass substrate is dried in an oven for 2 hours at 60° C., then dried for 6 hours at 80° C., then dried for 10 hours at 100° C., then dried for 6 hours at 120° C. A composite membrane that is made from the resin material and the composite material is thus produced. The produced composite membrane is washed for 6 hours with 90° C. hot water in order to remove the LiCl from the membrane.

The composite membranes that are shown below are produced by the process that is described above.

Figure 3:
FIG. 3 is a photograph of a specimen 1.
Figure 4:
FIG. 4 is a photograph of a specimen 2.
Figure 5:
FIG. 5 is a photograph of a specimen 3.

(1) Specimen 1: Resin material: PBI-1 only/Composite material: P composite material
(2) Specimen 2: Resin material: PBI-1 only/Composite material: Si composite material
(3) Specimen 3: Resin material: PBI-1+SPEEK/Composite material: P composite material
(4) Specimen 4: Resin material: PBI-2 only/Composite material: P composite material
(5) Specimen 5: Resin material: PBI-2 only/Composite material: Si composite material
(6) Specimen 6: Resin material: PBI-2+SPEEK/Composite material: P composite material Photographs of the produced specimens 1 to 3 are shown in FIGS. 3 to 5.

Figure 6:
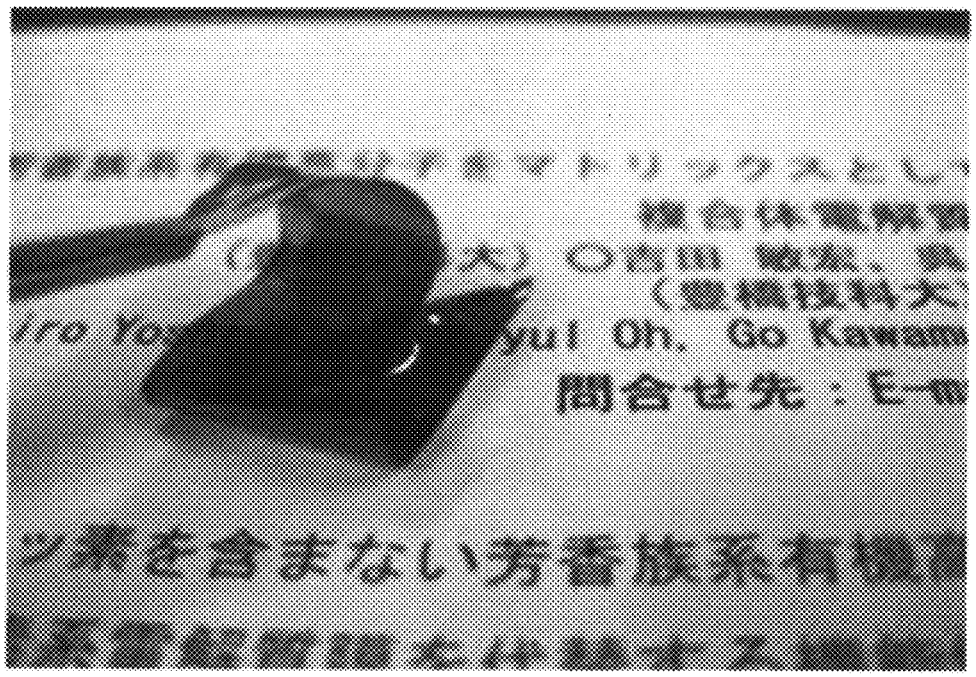
FIG. 6 is a photograph of a specimen 7.

Membranes that were made of PBI only and did not contain a composite material were made for comparison with the composite membranes (these membranes are hereafter called the comparison membranes). PBI was dissolved in a casting solvent. The concentration of PBI was 5% by weight. The concentration of the stabilizing agent was 3% of the PBI by weight. The solution was agitated and cast on a glass substrate. After the casting, the glass substrate was dried in an oven for 2 hours at 60° C., then dried for 6 hours at 80° C., then dried for 10 hours at 100° C., then dried for 6 hours at 120° C. The comparison membranes were thus produced. The comparison membrane that was made from PBI-1 only was called specimen 7. The comparison membrane that was made from PBI-2 only was called specimen 8. A photograph of the produced specimen 8 is shown in FIG. 6.

Phosphoric Acid Doping

The specimens 1 to 8 were immersed in 85% pure phosphoric acid and were heated in an oven at 60° C. The phosphoric acid doping levels were regulated by varying the immersion times. The phosphoric acid doping level (PADL) is computed from the weights of the membrane before and after phosphoric acid doping, based on equation (1) below.

$$PADL = (W - W_0)/W_0 \times 100(\%) \quad (1)$$

$W_0$ indicates the weight of the membrane before the phosphoric acid doping. W indicates the weight of the membrane after the phosphoric acid doping.

2. Evaluation Methods

With respect to the produced composite membranes and comparison membranes, (a) evaluations by nuclear magnetic resonance (NMR), (b) evaluations by Fourier transform—infrared spectroscopy (FT-IR), (c) evaluations by TGA, (d) doping level evaluations, (e) surface structure analyses by the BET method, and (f) electro-chemical evaluations were conducted. These will be explained in detail below.

(a) Measurements by Nuclear Magnetic Resonance (NMR)

The atomic geometry of the composite membrane (specimen 4) was specified by making measurements using nuclear magnetic resonance (NMR). The Unity-400P (Varian Technologies Japan, Ltd.) was used as the NMR measuring instrument. Dimethlysulfoxide-d6 (DMSO-d6, Nacalai Tesque, Inc.) was used as the NMR solvent. The PBI concentration was 5% by weight.

The presence of hydrogen bonds in the composite material was evaluated by making measurements using $^1$H-magic-angle spinning nuclear magnetic resonance ($^1$H-MAS-NMR). The measuring instrument and the measurement conditions were the same as for the measurement by NMR described above. The seven materials listed below were used as the specimens. Note that the ratio notations below indicate the mole ratios.

(1) Cesium hydrogen sulfate only (cesium hydrogen sulfate:phosphotungstic acid hydrate=100:0)
(2) P composite material (cesium hydrogen sulfate:phosphotungstic acid hydrate=90:10)
(3) P composite material (cesium hydrogen sulfate:phosphotungstic acid hydrate=80:20)
(4) P composite material (cesium hydrogen sulfate:phosphotungstic acid hydrate=70:30)
(5) P composite material (cesium hydrogen sulfate:phosphotungstic acid hydrate=60:40)
(6) P composite material (cesium hydrogen sulfate:phosphotungstic acid hydrate=50:50)
(7) Phosphotungstic acid hydrate only (cesium hydrogen sulfate:phosphotungstic acid hydrate=0:100)

(b) Measurements by Fourier Transform—Infrared Spectroscopy (FT-IR)

The molecular structure of the composite membrane (specimen 4) was specified by making measurements using Fourier transform—infrared spectroscopy (FT-IR). The Varian 3100 FT-I (Varian Technologies Japan, Ltd.) was used as the FT-IR measuring instrument. Evaluation was made by making measurements from 400 to 4000 cm$^{-1}$ a cumulative total of 64 times.

(c) Measurements by TGA

The thermal stability of the membranes was evaluated using thermogravimetry thermal analysis (TGA), based on changes in the weights of specimen 4 and specimen 8 in relation to an increase in temperature. The Rigaku Thermo Plus TG 8120 (Rigaku Corporation) was used as the TGA measuring instrument. The thermal stability was measured in a case where the atmospheric temperature was raised 10° C. at a time at one-minute intervals in an air atmosphere. The measurements were made in the range from room temperature to 900° C.

(d) Doping Level Evaluations

The PADL was computed based on the computation formula that is shown in equation (1), and the changes in the doping level over time during the phosphoric acid doping were evaluated. The phosphoric acid doping was done in a 60° C. environment. Specimen 1 to specimen 8 were used. The weights of membranes were measured by an electronic balance (AB204-S/FACT, Mettler-Toledo International Inc.).

(e) Measurements by the BET Method

The surface structure of composite membrane (specimen 4) was analyzed using the BET method (the S. Brunauer—P. H. Emmett—E. Teller method). The BELSORP (BEL Japan, Inc.) was used as the measuring instrument. Composite membranes to be used as specimens were made in each of the four formulations below, in combination with PBI-2. Note that the ratio notations below indicate the mole ratios.

(1) Phosphotungstic acid hydrate only
(2) P composite material (cesium hydrogen sulfate:phosphotungstic acid hydrate=10:90)
(3) P composite material (cesium hydrogen sulfate:phosphotungstic acid hydrate=50:50)
(4) P composite material (cesium hydrogen sulfate:phosphotungstic acid hydrate=90:10)

(f) Electro-chemical Evaluations

A single fuel cell 50 was made to contain the produced composite membranes. Characteristics of the relationship between output current density and output voltage and characteristics of the relationship between output current density and output power density were evaluated by using the single fuel cell 50.

Figure 7:
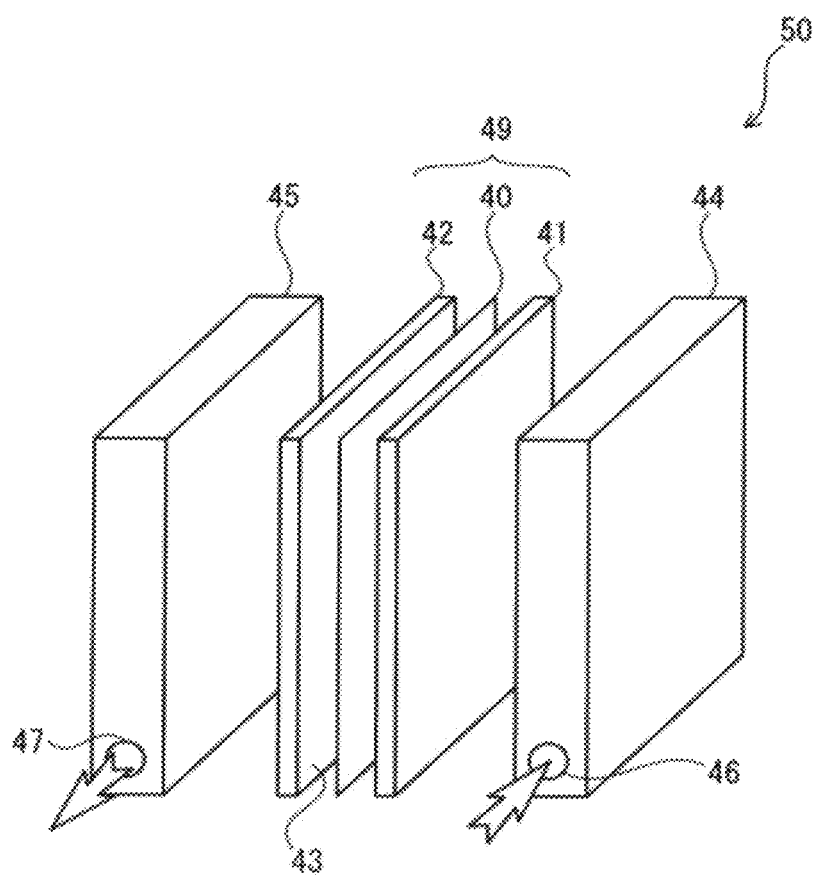
FIG. 7 is a figure that shows a structure of a single fuel cell 50.
Figure 8:
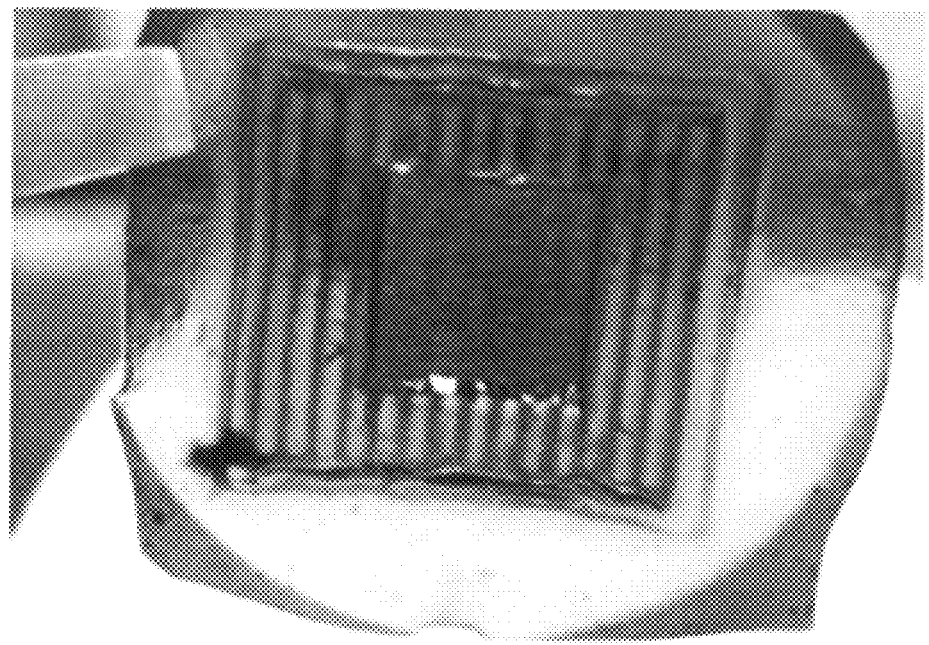
FIG. 8 is a photograph of a prepared MEA 49.
Figure 9:
FIG. 9 is a photograph of the single fuel cell 50.

A general explanation of the single fuel cell 50 will be given with reference to FIGS. 7 to 9. An anode electrode 41 and a cathode electrode 42 are provided, each of which has an ionomer layer 43 on its surface. Commercially available electrodes that contain platinum (0.5 milligrams per square centimeter) are used for the anode electrode 41 and the cathode electrode 42. The ionomer layers 43 are formed on the surfaces of the anode electrode 41 and the cathode electrode 42 by doping PBI onto the electrodes. The anode electrode 41 and the cathode electrode 42 are positioned on opposite sides of a produced electrolyte membrane 40 such that the ionomer layers 43 are oriented to come into contact with the electrolyte membrane 40. The anode electrode 41 and the cathode electrode 42 are compressed from both sides at a pressure of 2 MPa under 130° C. conditions. An MEA 49 is thus produced (refer to FIG. 8). The MEA 49 is sandwiched between graphites 44, 45, which act as gas diffusion layers. An inlet 46 through which fuel gas is injected is provided in the graphite 44. An outlet 47 through which water is discharged is provided in the graphite 45. A mixture of pure hydrogen and air is used as the fuel gas.

An electro-chemical measurement system (including SI 1252A and SI 1287, Solartron) was used for the characteristics of the relationship between output current density and output voltage and the characteristics of the relationship between output current density and output power density. Data were collected using dedicated software (Core Ware). The measurement temperatures were from 90° C. to 190° C. The measurements were made using the single fuel cell 50 under non-humidified conditions (refer to FIG. 9).

Specimens 4, 5, 6, and 8 were used. For specimen 4, phosphoric acid was doped such that the PADL became 277%. For specimen 5, phosphoric acid was doped such that the PADL became 229%. For specimen 6, phosphoric acid was doped such that the PADL became 202%. For specimen 8, phosphoric acid was doped such that the PADL became 263%. The relationship between the structure and the electro-chemical characteristics of the produced electrolyte membrane 40 was verified by measuring the characteristics of the relationship between output current density and output voltage and the characteristics of the relationship between output current density and output power density of the electrolyte membrane 40.

In addition, phosphoric acid was doped into specimen 4 such that the PADLs became 172%, 250%, 263%, 277%, 318%, and 350%, respectively. The relationship between the doping level and the electro-chemical characteristics was verified by measuring the characteristics of the relationship between output current density and output voltage and the characteristics of the relationship between output current density and output power density of the produced electrolyte membrane 40.

3. Evaluation Results (a) NMR Evaluations

Figure 10:
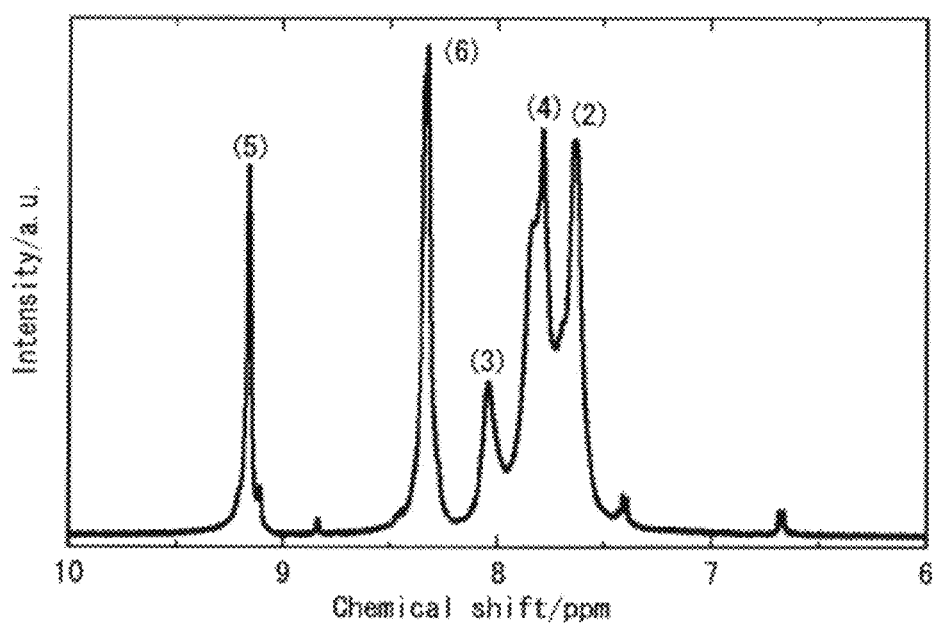
FIG. 10 is a figure that shows results of measurement by HNMR.
Figure 11:
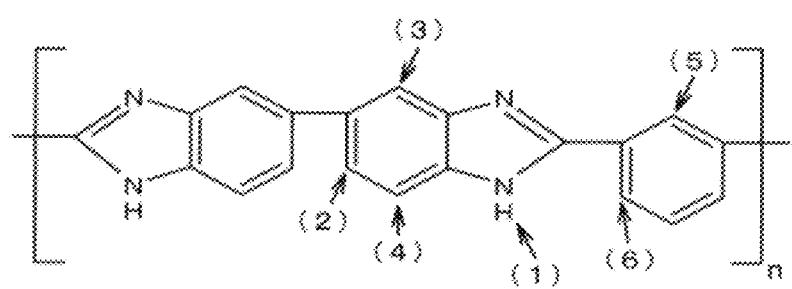
FIG. 11 is a figure that shows a molecular structure of PBI.

The results of the measurements by NMR are shown in FIG. 10. The chemical formula for PBI is shown in FIG. 11.

As shown in FIG. 10, a total of six noticeable peaks (1) to (6) ((1) is not shown in the drawing) were detected by the measurements. The strengths of the peaks were respectively (1): 13.32, (2): 7.61, (3): 8.03, (4) 7.83, (5): 9.13, and (6): 8.31. The peaks (1) to (6) respectively correspond to the hydrogen atoms that are in positions (1) to (6) in FIG. 11. Based on these results, it was confirmed that PBI is contained in the produced composite membrane.

Figure 12:
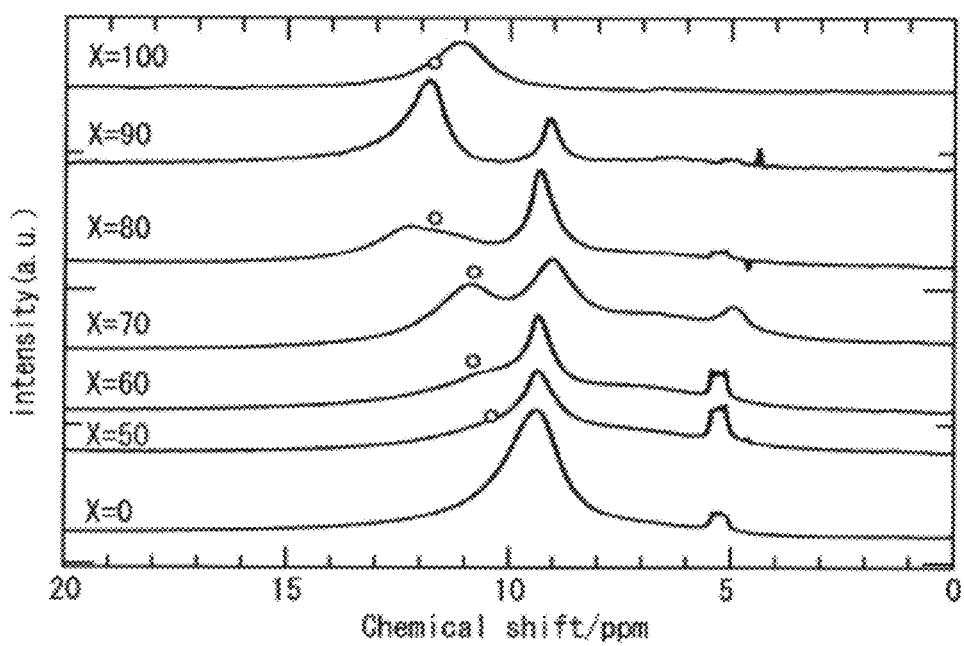
FIG. 12 is a figure that shows results of measurement by $^1$H-MAS-NMR.

The results of the measurements by $^1$H-MAS-NMR are shown in FIG. 12. The X's in the figure indicate the mole ratios for the cesium hydrogen sulfate. As shown in FIG. 12, the noticeable peaks for the composite material are observed more to the low magnetic field side as the mole ratio of the cesium hydrogen sulfate increases (X=50% to 90%). The peaks are attributable to the hydrogen bonds between the cesium hydrogen sulfate and the phosphotungstic acid hydrate. Based on these results, it was concluded that hydrogen bonds are formed between the hydrogen sulfate (a Brønsted acid) and the heteropoly acid (a Brønsted base) by the mechanical milling of the hydrogen sulfate and the heteropoly acid. Note that it is inferred that the good electrical conduction characteristics that the produced electrolyte membrane has are due to the effects of the hydrogen bonds.

(b) FT-IR Evaluations

Figure 13:
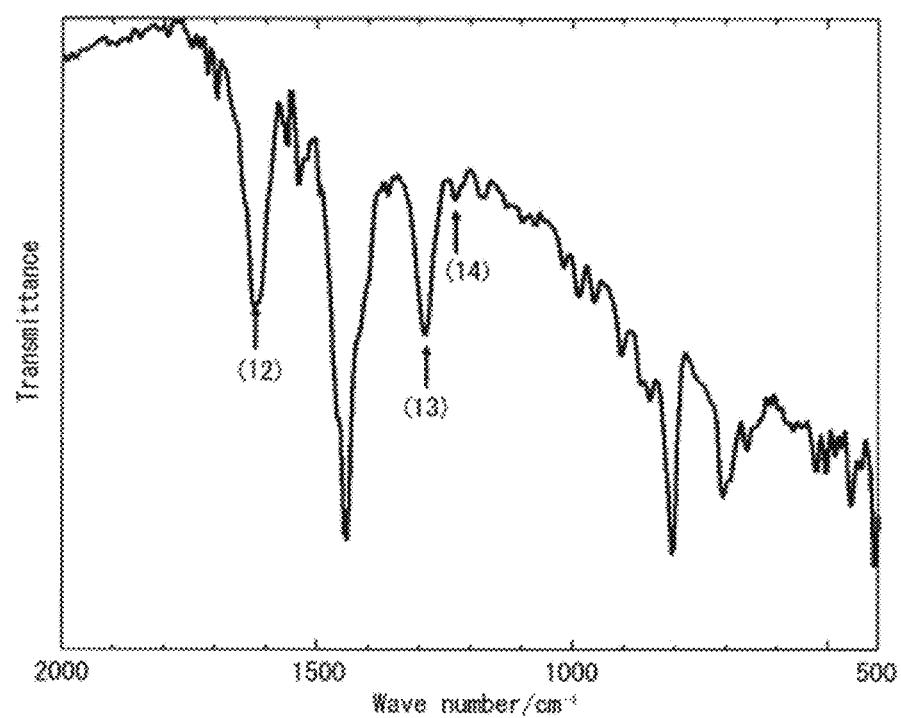
FIG. 13 is a figure that shows results of measurement by FT-IR.

The measurement results are shown in FIG. 13. As shown in FIG. 13, four noticeable peaks (11) to (14) ((11) is not shown in the drawing) were detected by the measurements. The wave numbers of the respective peaks were (11): 3402, (12): 1626, (13): 1287, and (14): 1222. The (11) peak is attributable to an N—H bond. The (12) peak is attributable to a C=C/C=N bond. The (13) peak is attributable to an imidazole ring structure. The (14) peak is attributable to imidazole structures that are substituted in positions 2 and 6 of the benzene ring. These structures are all contained in PBI. Based on these results, it was confirmed that PBI is contained in the produced composite membrane.

(c) Evaluations by TGA

Figure 14:
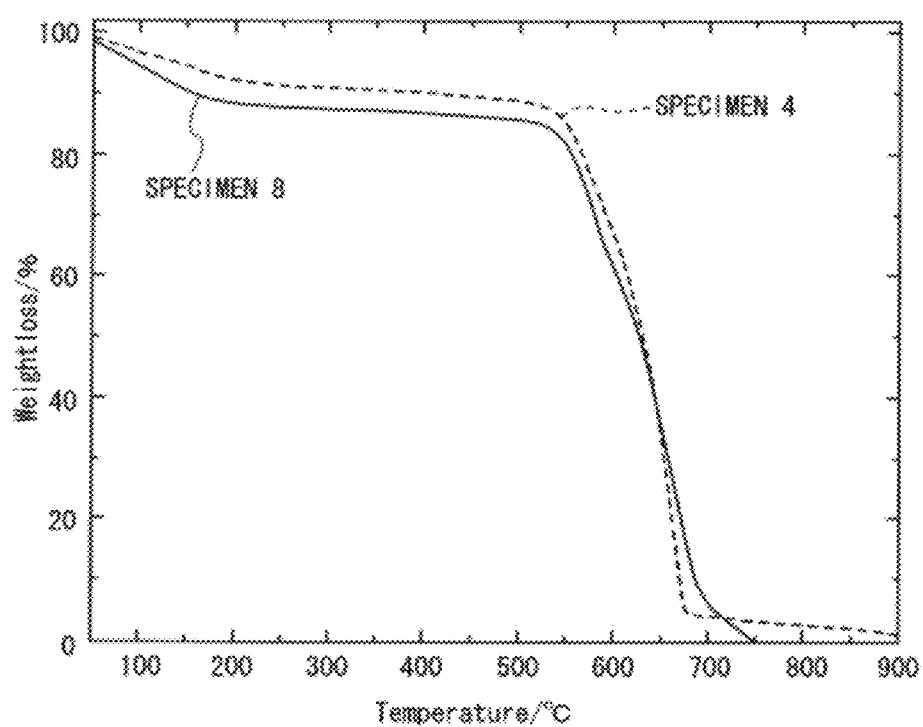
FIG. 14 is a figure that shows results of measurement by TGA.

The measurement results are shown in FIG. 14. As shown in FIG. 14, it was noted that removal of the water that has been absorbed occurs between room temperature and 200° C. It was also confirmed that the main structure of the resin is broken down in the high temperature range that starts close to 500° C. Based on these results, it was concluded that specimen 4 and specimen 8 are thermally stable in an air atmosphere from room temperature to 500° C.

(d) Doping Level Evaluations

Figure 15:
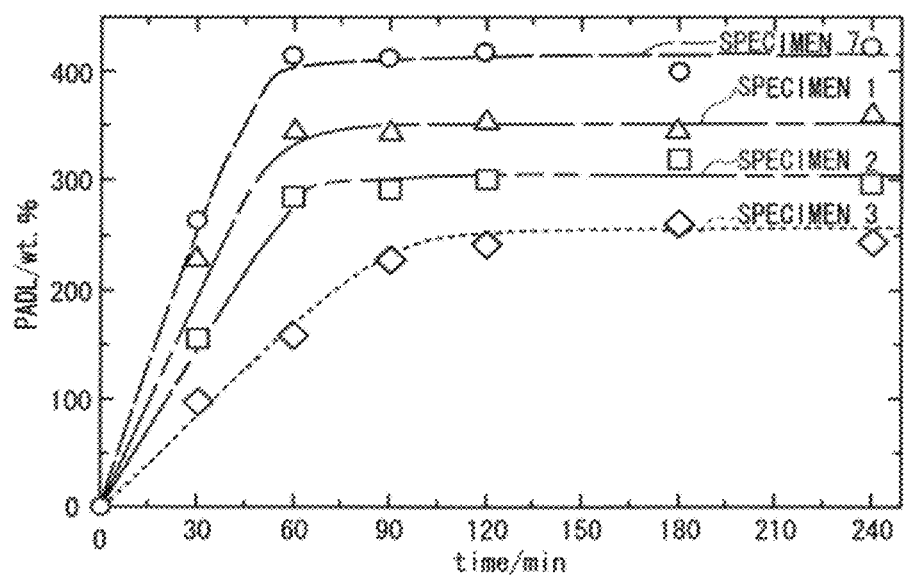
FIG. 15 is a figure that shows changes in PADL over time.
Figure 16:
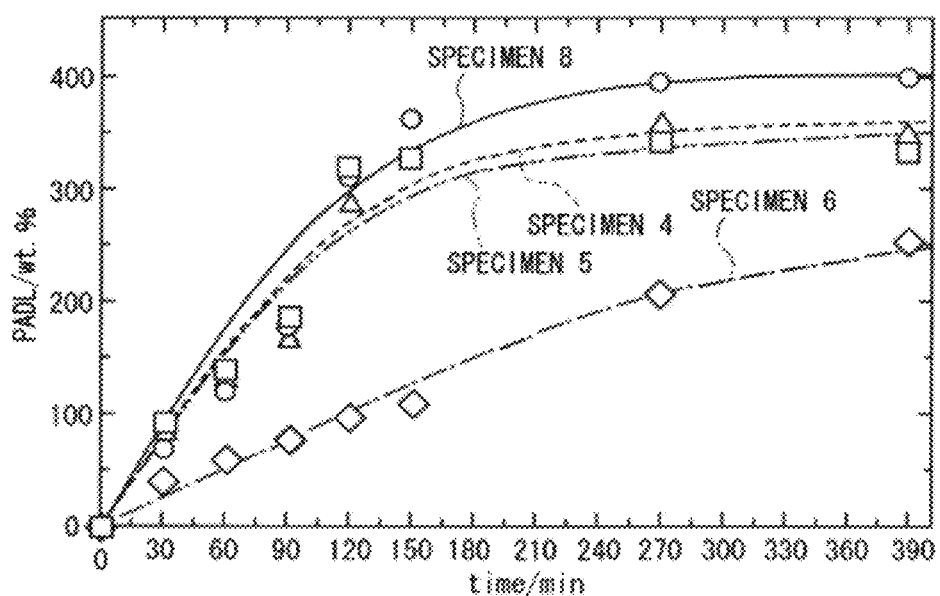
FIG. 16 is a figure that shows changes in PADL over time.

The measurement results are shown in FIGS. 15 and 16. As shown in FIG. 15, it was determined that the phosphoric acid was doped well into specimens 1 to 3. Based on these results, it was concluded that the phosphoric acid was doped well in the cases where only PBI-1 was used as the resin material (specimens 1, 2) and in the case where PBI-1 and SPEEK were used (specimen 3). It was also concluded that the phosphoric acid is doped well in a case where a heteropoly acid that contains one of phosphorus (specimens 1, 3) and silicon (specimen 2) is used as the composite material.

As shown in FIG. 16, it was determined that the phosphoric acid is doped well when specimens 4 to 6 were used as the composite membranes. Based on these results, it was concluded that the phosphoric acid was doped well in the cases where only PBI-2 was used as the resin material (specimens 4, 5) and in the case where PBI-2 and SPEEK were used (specimen 6). It was also concluded that the phosphoric acid is doped well in a case where a heteropoly acid that contains one of phosphorus (specimens 4, 6) and silicon (specimen 5) is used as the composite material.

(e) Results of Measurements by the BET Method

The measurement results are shown in Table 1.

Based on the measurement results, it was noted that both the specific surface area and the pore volume were greater for the composite membrane that used the P composite material that contained cesium hydrogen sulfate and phosphotungstic acid hydrate in a 50:50 mole ratio than for the composite membrane that used only phosphotungstic acid hydrate (specific surface area: 9.8 vs. 4.1 ($m^2g^{-1}$), pore volume: 19.1 vs. 7.6 ($10^{-3}$ $cm^3g^{-1}$)). Based on these results, it was concluded that the produced composite membrane has the optimum finely textured surface structure (specific surface area, pore volume). It was also concluded that a composite membrane with an even better finely textured surface structure can be made by using the composite material in which the cesium hydrogen sulfate and the phosphotungstic acid hydrate are combined in a 50:50 mole ratio.

TABLE 1

|  | Specific surface area ($m^2g^{-1}$) | Pore volume ($10^3$ $cm^3g^1$) |
|---|---|---|
| Phosphotungstic acid hydrate only | 4.1 | 7.6 |
| Cesium hydrogen sulfate and phosphotungstic acid hydrate = 10:90 | 2.8 | 5.9 |
| Cesium hydrogen sulfate and phosphotungstic acid hydrate = 50:50 | 9.8 | 19.1 |
| Cesium hydrogen sulfate and phosphotungstic acid hydrate = 90:10 | N/A | N/A |

(f) Electro-chemical Evaluations (Output Current Density vs. Output Voltage Characteristics, Output Current Density vs. Output Power Density Characteristics)

Figure 17:
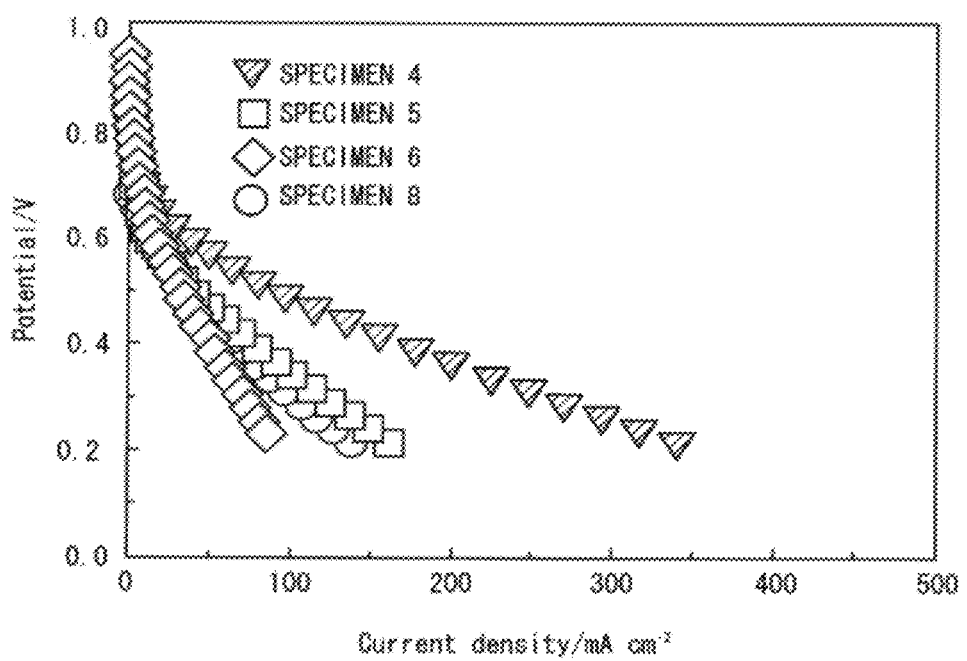
FIG. 17 is a figure that shows characteristics of a relationship between output current density and output voltage.
Figure 18:
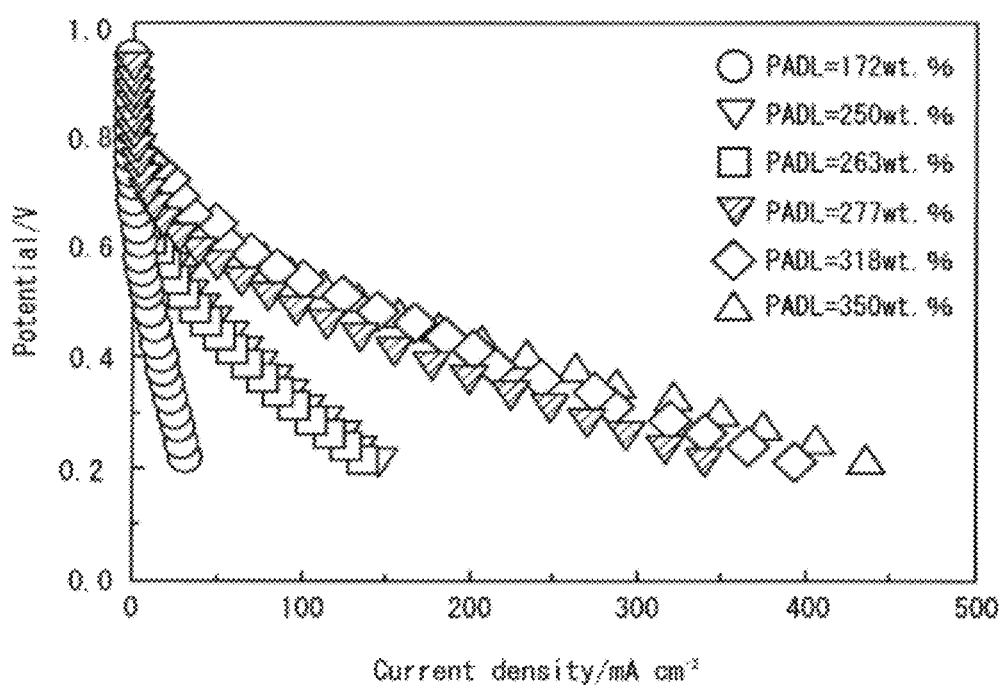
FIG. 18 is a figure that shows characteristics of the relationship between output current density and output voltage.
Figure 19:
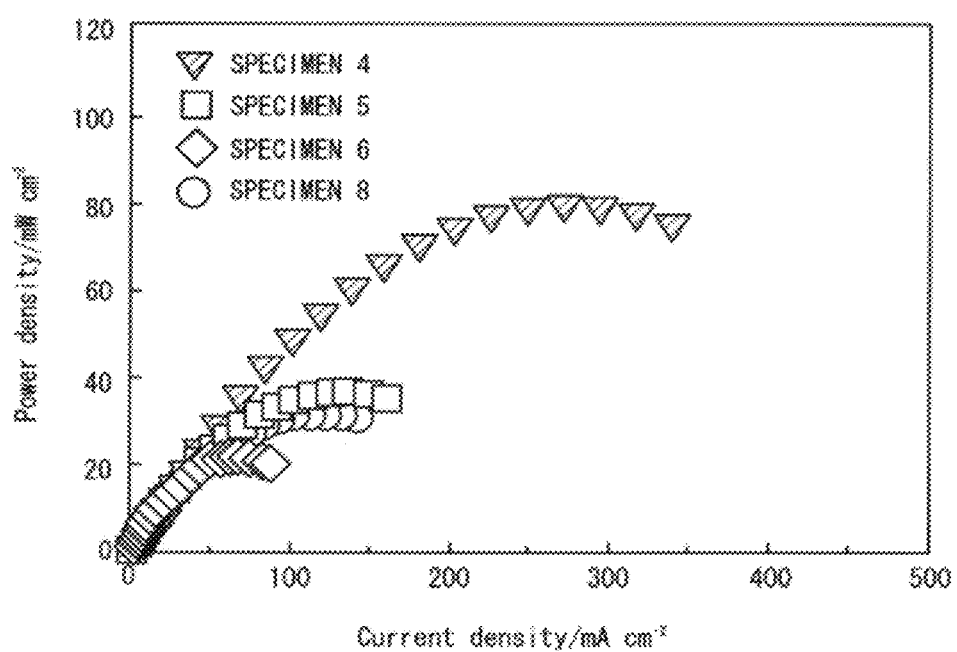
FIG. 19 is a figure that shows characteristics of a relationship between output current density and output power density.
Figure 20:
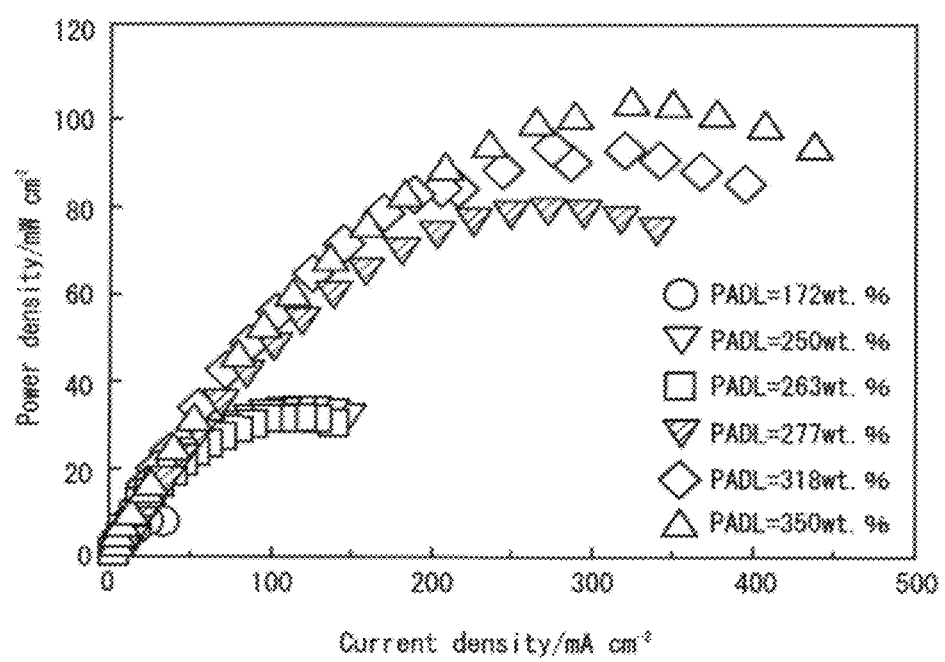
FIG. 20 is a figure that shows characteristics of the relationship between output current density and output power density.

The measurement results for the characteristics of output current density versus output voltage are shown in FIGS. 17 and 18. The measurement results for the characteristics of output current density versus output power density are shown in FIGS. 19 and 20.

As shown in FIG. 17, in the cases where specimen 5 and specimen 6 were used, it was determined that almost the same characteristics of output current density versus output voltage were exhibited as for specimen 8 (in a case where the output current density was approximately 100 mAcm$^{-2}$, the output voltage was approximately 0.3 volts). Furthermore, in the case where specimen 4 was used, it was determined that the output voltage had shifted to a higher value than in the case where specimen 8 was used (in a case where the output current density was approximately 100 mAcm$^{-2}$, the output voltage was approximately 0.5 volts).

In a fuel cell, the voltage at both cell terminals ordinarily drops when the output current density increases. The voltage drop is a loss for the fuel cell, so the smaller the drop is, the better the energy efficiency of the fuel cell becomes. Based on the results described above, it was determined that the resin materials that contain only PBI-2 (specimens 4, 5) and the resin material that contains PBI-2 and SPEEK (specimen 6) can be used as the resin material for making the electrolyte membrane. It was also determined that the heteropoly acids that contain one of phosphorus (specimens 4, 6) and silicon (specimen 5) can be used as the composite material. It was further determined that an electrolyte membrane with even better energy efficiency can be made by using a resin material that contains PBI-2 and the P composite material (specimen 4).

As shown in FIG. 18, it was determined that the output voltage shifts to higher values as the phosphoric acid doping level (PADL) is increased from 172% to 350%. It was also determined that characteristics that are at least equivalent to those of specimen 8 (using only PBI-2 as the resin material; refer to FIG. 17) are achieved by making the phosphoric acid doping level at least 250% to 350%. It was further determined that the amount of increase in the output voltage becomes greater in a case where the phosphoric acid doping level is raised from 263% to 277% (in a case where the output current density is approximately 100 mAcm$^{-2}$, the output voltage increases from 0.2 volts to 0.5 volts). Based on these results, it was concluded that an electrolyte membrane with high energy efficiency can be made, even at a low doping level, by making the phosphoric acid doping level in the composite membrane at least 172% to 350%, preferably 250% to 350%, and most desirably 277%.

As shown in FIG. 19, it was determined that in the cases where specimen 5 and specimen 6 were used, almost the same characteristics of output current density versus output power density were exhibited as for specimen 8 (in a case where the output current density was approximately 100 mAcm$^{-2}$, the output power density was approximately 30 mWcm$^{-2}$). In the case where specimen 4 was used, it was determined that the output current density shifts to a higher value than when specimen 8 was used (in a case where the output current density was approximately 100 mAcm$^{-2}$, the output power density was approximately 45 mWcm$^{-2}$). Based on these results, it was determined that the resin materials that contain only PBI-2 (specimens 4, 5) and the resin material that contains PBI-2 and SPEEK (specimen 6) can be used as the resin material for making the electrolyte membrane. It was also determined that the heteropoly acids that contain one of phosphorus (specimens 4, 6) and silicon (specimen 5) can be used as the composite material. It was further determined that an electrolyte membrane that can output even greater power can be made by using a resin material that contains PBI-2 and the P composite material (specimen 4).

As shown in FIG. 20, it was determined that the output power density shifts to higher values as the phosphoric acid doping level (PADL) is increased from 172% to 350%. It was also determined that characteristics that are at least equivalent to those of specimen 8 (using only PBI-2 as the resin material) are achieved by making the phosphoric acid doping level at least 250% to 350%. It was further determined that the amount of increase in the output power density becomes greater in a case where the phosphoric acid doping level is raised from 263% to 277%. Based on these results, it was concluded that an electrolyte membrane that can output high power can be made, even at a low doping level, by making the phosphoric acid doping level in the composite membrane at least 172% to 350%, preferably 250% to 350%, and most desirably 277%.

Given the results that are described above, it has been made clear that an electrolyte membrane that is made from a resin material of PBI and a composite material that is produced by the mechanical milling of hydrogen sulfate and heteropoly acid, and into which phosphoric acid has been doped, can achieve high energy efficiency and output high power, even at a low doping level.

The invention claimed is:

1. An electrolyte membrane, comprising:
a resin material that contains at least polybenzimidazole;
a composite material that is produced from hydrogen sulfate and heteropoly acid, and in which the hydrogen sulfate and the heteropoly acid are bonded by a hydrogen bond, said hydrogen bond being a result of mechanical milling of the hydrogen sulfate and the heteropoly acid; and
an electron-accepting substance.

2. The electrolyte membrane according to claim 1, wherein:
the mole ratio of the hydrogen sulfate and the heteropoly acid that are contained in the composite material is in a range from 50:50 to 10:90.

3. The electrolyte membrane according to claim 1, wherein:
the electron-accepting substance is phosphoric acid.

4. The electrolyte membrane according to claim 3, wherein:
the phosphoric acid is present at a ratio of not less than 172% and not greater than 350% of the total weight of the resin material and the composite material.

5. The electrolyte membrane according to claim 1, wherein:
the hydrogen sulfate contains a monovalent cation.

6. The electrolyte membrane according to claim 1, wherein:
the heteropoly acid contains one of phosphorus and silicon.

7. The electrolyte membrane according to claim 1, wherein:
the heteropoly acid contains one of tungsten and molybdenum as a hetero atom.

8. A fuel cell that is provided with the electrolyte membrane according to claim 1.

9. An electrolyte membrane manufacturing method, comprising:
a first process that creates, by mechanical milling of hydrogen sulfate and heteropoly acid, a composite material in which the hydrogen sulfate and the heteropoly acid are bonded by a hydrogen bond;
a second process that makes a composite membrane that contains at least the composite material that has been created by the first process and a resin material that contains at least polybenzimidazole; and
a third process that creates an electrolyte membrane by doping an electron-accepting substance into the composite membrane that has been made by the second process.

10. The electrolyte membrane manufacturing method according to claim 9, further comprising:
a fourth process that creates the resin material by creating the polybenzimidazole by polymerizing diaminobenzidine and isophthalic acid,
wherein the second process makes the composite membrane by using the resin material that has been created by the fourth process.

11. The electrolyte membrane manufacturing method according to claim 9, further comprising:
a fourth process that creates the resin material by creating the polybenzimidazole by polymerizing diaminobenzidine hydrochloride and isophthalic acid,
wherein the second process makes the composite membrane by using the resin material that has been created by the fourth process.

12. The electrolyte membrane manufacturing method according to claim 9, wherein:
the second process makes the composite membrane such that it also contains lithium chloride.

13. The electrolyte membrane manufacturing method according to claim 12, wherein:

the second process is provided with a fifth process that removes the lithium chloride by washing the created composite membrane with hot water.

14. The electrolyte membrane manufacturing method according to claim 9, wherein:
the electron-accepting substance is phosphoric acid.

15. The electrolyte membrane manufacturing method according to claim 14, wherein:
the phosphoric acid is doped in the third process at a ratio of not less than 172% and not greater than 350% of the total weight of the resin material and the composite material.

* * * * *